Jan. 31, 1967 G. R. DARLING ETAL 3,301,969

TELEPHONE GUARD

Filed Sept. 23, 1963

INVENTORS
GERTRUDE R. DARLING
WILLIAM V. DARLING

United States Patent Office 3,301,969
Patented Jan. 31, 1967

3,301,969
TELEPHONE GUARD

Gertrude R. Darling and William V. Darling, both of 314 S. Wateka St., San Jacinto, Calif. 92383

Filed Sept. 23, 1963, Ser. No. 310,637
5 Claims. (Cl. 179—189)

Generally speaking, the present invention relates to a telephone guard for preventing the undesired removal of a telephone handset from the telephone cradle of a telephone. This covers both the prevention of the removal of a telephone handset from a telephone cradle by an infant or pet and also covers the accidental dislodgment or removal of a telephone handset from a telephone cradle, such as by knocking over the telephone.

It should be clearly noted that the present invention is not intended as a lock for preventing unauthorized telephone calls, but is merely intended for the purposes set forth in the preceding paragraph—that is, to prevent the unintended removal or dislodgment, either accidentally or as the result of the action of an infant or a pet, of a telephone handset from a telephone cradle.

With the above points in mind, it is an object of the present invention to provide a novel telephone guard which is adapted for quick and easy mounting and attachment with respect to a conventional "French" type telephone and which, when so mounted, positions a pivotally mounted locking member adjacent to the normal position of the telephone handset when received on the telephone cradle so that said locking member can be moved into either an open disengaged position with respect to said telephone handset or can be moved into a locked or engaged position overlying said telephone handset whereby to retain it on the telephone cradle for the above-outlined purposes of the present invention.

It is a further object of the present invention to provide a novel telephone guard of the type referred to in the preceding object including novel latching means for retaining said locking member in said engaged position for retaining said telephone handset on said telephone cradle until controllably unlatched by operation of a digitally operable unlatching member.

It is a further object of the present invention to provide a novel telephone guard of the character referred to in the preceding object wherein the latching means is provided with biasing spring means normally biasing it toward a latching relationship with respect to said locking member and wherein said locking member is provided with biasing spring means normally biasing it toward said open disengaged position with respect to said telephone handset.

It is a further object of the present invention to provide a telephone guard of the character referred to above which is provided with base means adapted to engage the conventional finger-receiving recess means of the telephone base portion and which is provided with novel supporting adapter means adapted to take up any looseness or play therebetween whereby to provide for a firm supporting engagement and attachment of said telephone guard with respect to a "French" type telephone.

It is a further object of the present invention to provide a novel telephone guard embodying any or all of the features referred to hereinbefore, either generically or specifically, individually or in combination, and which is of relatively simple, inexpensive, easy-to-install, easy-to-operate construction capable of mass manufacture at relatively low cost whereby to be conducive to widespread use thereof.

Further objects are implicit in the detailed description which follows hereinafter (which is to be considered as exemplary of, but not specifically limiting, the present invention) and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying single drawing sheet and are described in detail hereinafter.

Figures 1, 2, 3, 4, 5, 6, 7, 8, 9, 10:
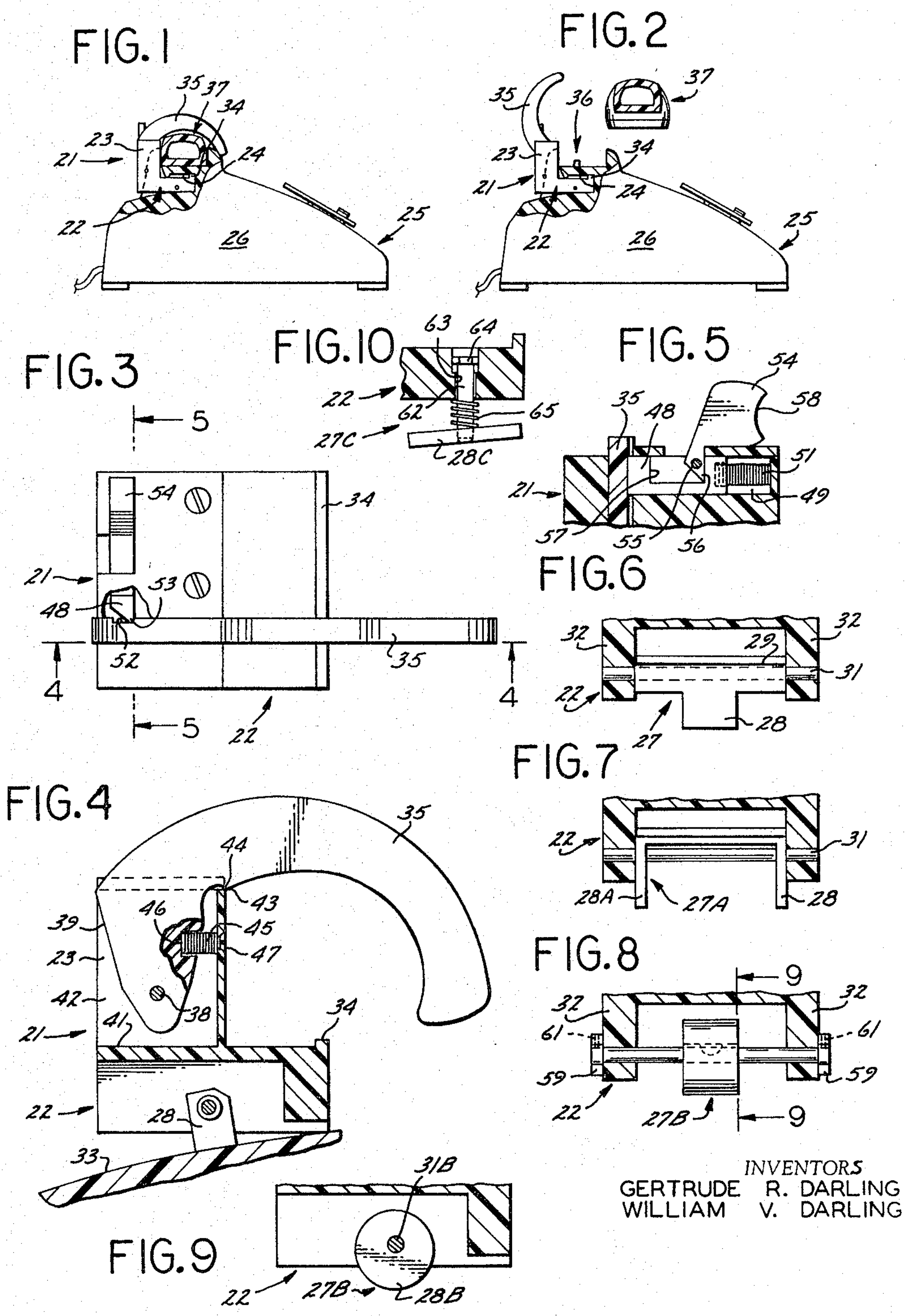
FIG. 1 is a reduced-size side elevational view showing one exemplary embodiment of the present invention in mounted, supported, and retained relationship with respect to a conventional "French" type telephone (which is shown partially broken away for reasons of drawing clarity). The locking member of the telephone guard is shown in handset-retaining relationship in this view.
FIG. 2 is a view generally similar to FIG. 1, but shows the locking member of the telephone guard in the disengaged handset-releasing position thereof whereby to allow the telephone handset to be removed from the telephone cradle in the manner shown in FIG. 2.
FIG. 3 is a larger-scale top plan view of the exemplary first form of the invention with a top plate portion thereof partially broken away in order to better show the engagement of the latching means and catch means when the locking member is in the telephone handset retaining relationship shown in FIGS. 1 and 3.
FIG. 4 is a fragmentary view, partly broken away, partly in elevation, and partly in section, taken in the direction of the arrows 4—4 of FIG. 3.
FIG. 5 is a fragmentary view taken in the direction of arrows 5—5 of FIG. 3.
FIG. 6 is a fragmentary view of a bottom portion of the L-shaped base means showing the exemplary first form of the supporting adapter means for taking up any play between said L-shaped base means and the underlying portion of the base portion of the telephone.
FIG. 7 is a view similar to FIG. 6 but illustrates a slight modification of said supporting adapter means.
FIG. 8 is a view similar to FIGS. 6 and 7 but illustrates a further slight modification of said supporting adapter means.
FIG. 9 is a view taken in the direction of the arrows 9—9 of FIG. 8.
FIG. 10 is a fragmentary side view, partly in section and partly in elevation, generally similar to a part of the bottom portion of FIG. 4, but illustrating a further modification of the supporting adapter means which is spring-biased whereby to be self-spacing and self-compensating.

Generally speaking, the telephone guard of the present invention comprises a substantially L-shaped base means, such as is indicated generally at 21, which is provided with a substantially transversely projecting bottom insertion portion 22 and an upwardly directed portion 23.

The above-mentioned bottom insertion portion 22 is adapted to be inserted into the conventional hand or finger-receiving recess means 24 by which the conventional "French" type telephone, indicated generally at 25, is normally adapted to be manually lifted and carried from one location to another. In other words, the transversely projecting bottom insertion portion 22 is inserted into said finger-receiving recess means 24 of the telephone 25 in lieu of one's fingers and is adapted to firmly engage same whereby to be retained and effectively mounted in a firm manner with respect to the base portion 26 of the telephone 25.

The above is facilitated by supporting adapter means, indicated generally at 27, comprising a pivotally mounted projecting or tongue-like member 28 having sleeve extension portions 29 which are pivotally mounted on the transverse pivot pin means 31 which is carried in downwardly directed laterally spaced side wall portions 32 of said bottom insertion portion 22.

The arrangement is such that when said bottom insertion portion 22 is inserted into the finger-receiving recess means 24 of the telephone base portion 26, the inclined wall part 33 of the telephone base portion 26 adjacent to said finger-receiving recess means 24 can be firmly engaged by said downwardly projecting pivotally mounted supporting adapter means or tongue means 28 whereby to take up any excess space and firmly lock the entire L-shaped base means 21 with respect to the telephone base portion 26 in the position best shown in FIGS. 1 and 2. It should be noted at this point that various other forms of supporting adapter means may be used in lieu of the specific one shown at 28 in the first form of the invention illustrated in FIGS. 1–6.

It should also be noted that, in the specific form of the invention described, the transversely projecting bottom insertion portion 22 has an upwardly directed engaging lip means 34 at the forward end thereof which facilitates the above-described firm retaining mounting engagement of said L-shaped base means 21 with respect to the telephone base portion 26.

The upwardly directed portion 23 of the L-shaped base means 21 is provided with, and pivotally carries, an effectively concave or substantially C-shaped locking member 35 which is positioned adjacent to the cradle means, indicated generally at 36, of the telephone 25 and adjacent to the handset means, indicated generally at 37, which normally is received by, and rests upon, said cradle means 36 when the telephone 25 is in a non-use position such as shown in FIG. 1.

It should be noted that, in the specific example illustrated, said locking member 35 is mounted by a transverse pivot pin means 38 which extends transversely through, and is mounted in, side parts of said upwardly directed portion 23 of said L-shaped base means 21 whereby to provide for pivotal movement of said locking member 35 from an open or disengaged position, as best shown in FIG. 2, wherein a stop shoulder portion 39 thereof abuts a stop portion 41 at the bottom of a slot 42 in which the rear end of said member 35 is pivotally mounted, into a closed locking or engaged position, as is best shown in FIGS. 1, 3 and 4, wherein a stop portion 43 of said locking member 35 abuts an inner stop edge or lip part 44 of said upright portion 23 of said L-shaped base means 21. This engaged or locking position is clearly shown in FIGS. 1, 3 and 4 and places said locking member 35 in a position immediately overlying the telephone handset 37, as is clearly shown in FIG. 1, whereby said telephone handset 37 will be positively retained on said telephone cradle 36 until the locking member 35 is effectively unlatched and allowed to return to the disengaged or open position shown in FIG. 2 which will allow said telephone handset 37 to be removed, if desired.

It should be noted that, in the exemplary form of the invention illustrated, said locking member 35 is normally biased toward the open or disengaged position shown in FIG. 2 by a biasing spring means 45 which effectively comprises a compression spring means seated at one end in a recess 46 in the latching member 35 and seated at the other end on an inwardly projecting screw 47.

The preferred form of the invention illustrated also includes latch means for retaining the locking member 35 in the engaged locked position shown in FIGS. 1, 3 and 4 whenever it is forcibly moved into said position against the action of said biasing spring means 45.

In the exemplary form of the invention illustrated, said latch means is indicated at 48 and comprises a member slidably mounted in a lateral recess 49 and provided with a biasing spring means 51 normally biasing it toward the side of an adjacent portion of said locking member 35 which is provided with catch means 52 at said location adapted to catch the tapered tip end 53 of said latch means 48 when in the latched relationship best shown in FIGS. 3 and 5.

The latch means 48 is provided with a digitally operable unlatching member 54 for unlatching cooperation with respect to, and movement of, said latch means 48.

In the exemplary form of the invention illustrated, the unlatching member 54 is pivotally mounted by a pivot pin or screw means 55 and has a downwardly projecting lever portion 56 lying in a cut-out recess 57 in the latch means 48 so that movement of the unlatching member 54 toward the left as viewed in FIG. 5, by pressing a finger against the finger-engageable cut-out 58, will force the latch means 48 toward the right as viewed in FIG. 5 against the action of the biasing spring means 51 and will effectively disengage the tip end 53 of the latch means 48 from the catch means 52 of the locking member 35 whereby to release same and allow said locking member 35 to be moved by its biasing spring means 45 into the open disengaged position shown in FIG. 2.

FIG. 7 is a fragmentary view illustrating a slightly modified form of the supporting adapter means of the exemplary first form of the invention. All portions of this modification of the invention substantially identical to the first form of the invention are indicated by similar reference numerals. However, the slightly modified supporting adapter means is indicated by the same reference numerals, followed by the letter "A," however, and comprises a substantially U-shaped bracket 27A pivotally mounted on the transverse pin 31 and having a pair of downwardly projecting portions 28A adapted to contact the underlying part 33 of the telephone base portion 26, such as shown in FIG. 9, for the same purposes as the first supporting adapter means 27 previously described. This modification has the additional advantage that it provide a central clear space so that one's fingers can still be inserted into the recess means 24 of the telephone base portion 26 so that the entire telephone 25 can be manually lifted and carried from one location to another with ease.

FIGS. 8 and 9 are fragmentary views illustrating a further modification of the supporting adapter means of the exemplary first form of the invention. All portions of this modification of the invention substantially identical to the first form of the invention are indicated by similar reference numerals. However, a slightly modified supporting adapter means is indicated by the same reference numeral, followed by the letter "B," however, and comprises an eccentric cam member 27B fixedly keyed to the transverse pivot pin 31B which is rotatably mounted in said side wall portions 32 of the bottom portion 22 of the L-shaped base means, with said pin 31B having extended threaded outer ends provided with retention nuts 59 rigidly fastened thereto by set screws 61. This modification of the invention is very slightly different from the first form of the invention in that after the transversely projecting bottom portion 22 of the L-shaped base means is forced into the telephone finger-receiving recess means 24 of the telephone base portion 26 (best shown in FIGS. 1 and 2) either of the nuts 59 can be rotated whereby to rotate the eccentric cam 27B so as to position the portion of greatest eccentricity 28B downwardly for contact with the underlying part of the telephone base portion, such as shown at 33 in FIG. 9, whereby to firmly lock the entire device with respect to the telephone base portion, such as the one shown at 26 in FIGS. 1 and 2. It should be noted that various other operating means for rotating the cam means 27B can be employed in lieu of the specific arrangement shown in FIGS. 8 and 9.

FIG. 10 is a fragmentary view illustrating a further slight modification of the supporting adapter means of the first form of the invention. All portions of this modification of the invention substantially identical to the first form of the invention are indicated by similar reference numerals. However, the slightly modified supporting adapter means is indicated by the same reference numerals, followed by the letter "C," however, and comprises a contact foot 28C carried by an arm or shaft 62 which is slidably mounted in a recess 63 for limited travel as determined by the head means 64 and which is provided with biasing spring means 65 normally biasing said contact foot 28C downwardly for engagement with the surface 33 of the telephone base portion 26, such as is shown in FIG. 9 with respect to the earlier form of the supporting adapter means.

It should be noted that any or all of the various supporting adapter means, such as indicated at 27, 27A, 27B, and 27C, may be made of, or provided with, an exterior compressible frictional portion which might be made of rubber, plastic, or various elastomeric materials or the like whereby to facilitate the frictional engagement thereof with the surface 33 of the telephone base portion 26 for enhancing the retaining engagement thereof.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A telephone guard for preventing the undesired removal of a telephone handset from a telephone cradle of a telephone of a type having an underlying base portion provided with said cradle adapted to carry said handset thereon, said base portion being provided with a finger-receiving recess means adapted for use in manually lifting and carrying the entire telephone, comprising: base means provided with a substantially transversely projecting bottom insertion portion arranged to be inserted into the finger-receiving recess means of the telephone base portion and to engage same in a retaining manner whereby to be retained and mounted with respect to the telephone base portion, said base means being provided with an upwardly directed portion provided with and pivotally carrying a locking member arranged to be positioned adjacent to the cradle of the telephone and the handset arranged to be received thereon, said locking member being pivotally movable between an open disengaged position with respect to the handset and an engaged locking position with respect to the handset lying substantially over the top of same whereby to retain the handset on the cradle, said upright member of said base means being provided with latch means and an adjacent portion of said locking member being provided with corresponding catch means cooperable with said latch means for retaining said locking member in said engaged locking position until controllably manually unlatched.

2. A telephone guard as defined in claim 1, wherein said latch means is provided with a digitally operable unlatching member positioned for unlatching cooperation with respect to, and movement of, said latch means and projecting beyond one side of said base means for manual engagement.

3. A telephone guard as defined in claim 1, wherein said latch means is provided with biasing spring means normally biasing it toward said catch means of said locking member.

4. A telephone guard as defined in claim 1, including biasing spring means normally biasing said locking member toward said open disengaged relationship.

5. A telephone guard for preventing the undesired removal of a telephone handset from a telephone cradle of a telephone of a type having an underlying base portion provided with said cradle adapted to carry said handset thereon, said base portion being provided with a finger-receiving recess means adapted for use in manually lifting and carrying the entire telephone, comprising: base means provided with a substantially transversely projecting bottom insertion portion having upwardly directed engaging lip means at the forward end thereof arranged to be inserted into the finger-receiving recess means of the telephone base portion and to engage same in a retaining manner whereby to be retained and mounted with respect to the telephone base portion, said base means being provided with an upwardly directed portion provided with and pivotally carrying an effectively concave substantially C-shaped locking member positioned adjacent to the cradle of the telephone and the handset adapted to be received thereon and pivotally movable between an open disengaged position with respect to the handset and an engaged locking position with respect to the handset lying substantially over the top of same whereby to retain the handset on the cradle, and biasing spring means normally biasing said locking member toward said open disengaged relationship with respect to the telephone handset, said upright member of said base means being provided with latch means and an adjacent portion of said locking member being provided with corresponding catch means cooperable with said latch means for retaining said locking member in said engaged locking position with respect to the telephone handset until controllably manually unlatched, said latch means being provided with biasing spring means normally biasing it toward said catch means of said locking member, said latch means being provided with a digitally operable unlatching member positioned for unlatching cooperation with respect to, and movement of, said latch means; said bottom insertion portion of said base means being provided with pivotally mounted supporting adapter means at the bottom thereof for supporting cooperation with an inclined part of the telephone base portion underlying the finger receiving recess means and being controllably positionable for providing a firm supporting engagement with respect thereto.

References Cited by the Examiner

UNITED STATES PATENTS

| | | | |
|---|---|---|---|
| 2,581,833 | 1/1952 | Boivin | 24—249 X |
| 2,647,959 | 8/1953 | Mahoney | 179—189 |
| 2,864,906 | 12/1958 | Medenbach | 179—189 |
| 3,023,451 | 3/1962 | Thoel | 292—210 X |
| 3,084,409 | 4/1963 | Griffiths | 24—250 X |

WILLIAM C. COOPER, *Acting Primary Examiner.*

L. A. WRIGHT, *Assistant Examiner.*